(12) United States Patent
Nagai et al.

(10) Patent No.: US 7,124,657 B2
(45) Date of Patent: Oct. 24, 2006

(54) ELECTRIC ACTUATOR AND METHOD OF ASSEMBLING THE SAME

(75) Inventors: Shigekazu Nagai, Adachi-ku (JP); Toru Sugiyama, Abiko (JP); Masahiko Someya, Ryugasaki (JP)

(73) Assignee: SMC Kabushiki Kaisha, Tokyo (JP)

( * ) Notice: Subject to any disclaimer, the term of this patent is extended or adjusted under 35 U.S.C. 154(b) by 225 days.

(21) Appl. No.: 10/378,822

(22) Filed: Mar. 5, 2003

(65) Prior Publication Data
US 2003/0172755 A1    Sep. 18, 2003

(30) Foreign Application Priority Data
Mar. 18, 2002    (JP) .............................. 2002-074372

(51) Int. Cl.
*F16C 29/00*    (2006.01)
(52) U.S. Cl. ...................................... 74/89.2; 74/89.22
(58) Field of Classification Search ............... 74/89.21, 74/89.22, 89.23, 89.33, 17.8, 89.2; 49/352; 364/7
See application file for complete search history.

(56) References Cited

U.S. PATENT DOCUMENTS

| | | | |
|---|---|---|---|
| 1,795,612 A | 3/1931 | Lormor | |
| 1,928,423 A * | 9/1933 | Hansen ...................... | 74/89.21 |
| 3,177,845 A | 4/1965 | Hedgepeth | |
| 3,273,408 A | 9/1966 | Nogel et al. | |
| 3,749,229 A | 7/1973 | Napadow | |
| 4,440,354 A * | 4/1984 | Kobayashi et al. ...... | 242/388.8 |
| 4,540,996 A | 9/1985 | Saito | |
| 4,583,619 A * | 4/1986 | Fry .............................. | 186/59 |
| 4,676,144 A | 6/1987 | Smith, III | |
| 4,746,766 A | 5/1988 | Soulard | |
| 4,898,351 A | 2/1990 | Suzuki | |
| 5,016,841 A | 5/1991 | Schumann et al. | |
| 5,063,344 A | 11/1991 | Linke | |
| 5,207,115 A * | 5/1993 | Takei ...................... | 74/479.01 |
| 5,460,059 A * | 10/1995 | Kato ......................... | 74/89.22 |
| 5,669,749 A | 9/1997 | Danielson et al. | |
| 5,747,896 A * | 5/1998 | Nagai et al. .................. | 310/20 |
| 5,764,839 A | 6/1998 | Igl et al. | |
| 6,166,332 A | 12/2000 | Farrow et al. | |
| 6,194,664 B1 | 2/2001 | Zamora et al. | |
| 6,215,068 B1 | 4/2001 | Meier | |
| 6,323,428 B1 | 11/2001 | Takano | |
| 6,756,707 B1 * | 6/2004 | Hochhalter et al. ........... | 310/20 |
| 2003/0067505 A1 | 4/2003 | Kumagel | |

(Continued)

FOREIGN PATENT DOCUMENTS

DE    26 27 528 A1    12/1977

(Continued)

OTHER PUBLICATIONS

The Random House College Dictionary, Revised Edition, Copyright 1980.*

(Continued)

*Primary Examiner*—William C. Joyce
(74) *Attorney, Agent, or Firm*—Paul A. Guss

(57) ABSTRACT

An electric actuator comprises an actuator body which is a rectangular tube have having two pairs of opposing surfaces disposed in parallel and which has a slit formed to extend by a predetermined length along an edge of the rectangular tube; a slider which reciprocates along the slit of the actuator body by a rotary driving source; the rotary driving source which is connected to one end of the actuator body; and a driving force-transmitting mechanism which converts the rotary driving force of the rotary driving source into the rectilinear motion which is transmitted to the slider.

4 Claims, 10 Drawing Sheets

U.S. PATENT DOCUMENTS

2003/0168224 A1* 9/2003 Freudenthaler et al. ....... 169/43
2003/0168244 A1* 9/2003 Nagai et al. ............. 174/117 F
2003/0217610 A1* 11/2003 Nagai et al. ................. 74/89.2
2004/0177993 A1* 9/2004 Nagai et al. ............. 174/117 F

FOREIGN PATENT DOCUMENTS

EP          0 918 174       5/1999
KR          1999-37034      10/1999

OTHER PUBLICATIONS

Schneeberger Linear Technology Automation, "Linear- und Rotationsmodule," Nov. 26, 2001, p. 4.

Europa-Lehrmitttel, "Der Werkzeugbau," Verlag Willing & Co., Wuppertal Barmen, 2. Auflage, 1959, pp. 102-107.

* cited by examiner

ELECTRIC ACTUATOR AND METHOD OF ASSEMBLING THE SAME

BACKGROUND OF THE INVENTION

1. Field of the Invention

The present invention relates to an electric actuator which makes it possible to allow a slider to reciprocate linearly along an actuator body, and a method of assembling the same.

2. Description of the Related Art

An electric actuator has been hitherto used, in which a workpiece placed on a slider is transported to a predetermined position by displacing the slider along an actuator body by a motor.

The conventional electric actuator of this type has a frame. Functional elements mounted on the frame include a driving force-transmitting section (e.g., a ball screw shaft or a timing belt), a guide section (e.g., a linear guide rail or a guide block), and a table unit. A cover, which closes the opening of the frame, is also provided in order to protect the internal structure of the frame.

The rigidity of the electric actuator is principally secured by the frame. In order to secure a high rigidity, it is necessary to enhance the geometrical moment of inertia of the frame. This means that a sufficient frame dimension is secured in a direction in which the rigidity of the frame is required. If the sufficient dimension is not secured, the wall thickness of the frame may be increased, for example, thus the increase in weight is inevitable.

When a variety of functional elements are arranged on the frame as described above, the direction of the rigid support means for the functional structure (direction in which the frame extends) is restricted. Therefore, for example, it is necessary to provide an auxiliary support member such as a bearing-holding structural member (housing). Further, a cover is required to protect the internal structure and the environment. When the auxiliary support member and the cover as described above should be provided, the entire weight of the electric actuator is increased, which relatively results in the decrease in rigidity since the weight to be supported by the frame is increased.

Further, when a variety of functional elements are arranged on the frame, the location of the frame is limited at a specified portion in the cross section. That is, the frame affects the support function and the attachment function for the entire electric actuator. Therefore, when the direction of attachment of the frame is limited to perform the operation in a desired position (e.g., in a lateral position or a cantilever position), it is necessary to provide, for example, a frame support means such as a bracket in order to support the frame. As a result, the overall rigidity is decreased, and the weight and dimension are increased.

The stress from the workpiece and the frame concentrates on the frame support means such as a bracket. Therefore, there is a need to use elements that are capable of withstanding the concentration of stress.

SUMMARY OF THE INVENTION

A general object of the present invention is to provide an electric actuator which makes it possible to realize a body structure having a light weight and a high rigidity within a restricted cross-sectional dimension, and a method of assembling the same.

According to the present invention, an actuator body is a rectangular tube which has two pairs of opposing surfaces, and a slider reciprocates through a slit which extends by a predetermined length along an edge of the rectangular tube. For example, the actuator body may have a structure of flat rectangular tube, and thus it is possible to obtain a body structure having a light weight and a high rigidity even if the height is restricted in the space of vertical cross-sectional dimension.

According to another aspect of the present invention, a plurality of positioning pins, which are provided on a positioning plate of a jig, are inserted into positioning holes of an actuator body, and a linear guide rail is inserted into a space extending in an axial direction, from an opening formed at an end of the actuator body.

Subsequently, the positioning plate slides together with the actuator body so that a positioning-shaft, which is provided on the jig, is inserted into a positioning shaft-inserting hole which is formed in the actuator body.

Further, a first side of the linear guide rail abuts against the positioning pins which penetrate through and protrudes from the positioning holes, and a second side disposed on a side opposite to the first side abuts against an end of the positioning-shaft. By positioning the linear guide rail in this way, an axis of the actuator body successfully coincides with an axis of the linear guide rail.

As described above, in the present invention, it is possible to simply perform the highly accurate centering alignment between the actuator body and the linear guide rail arranged in the space therein by using the jig.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
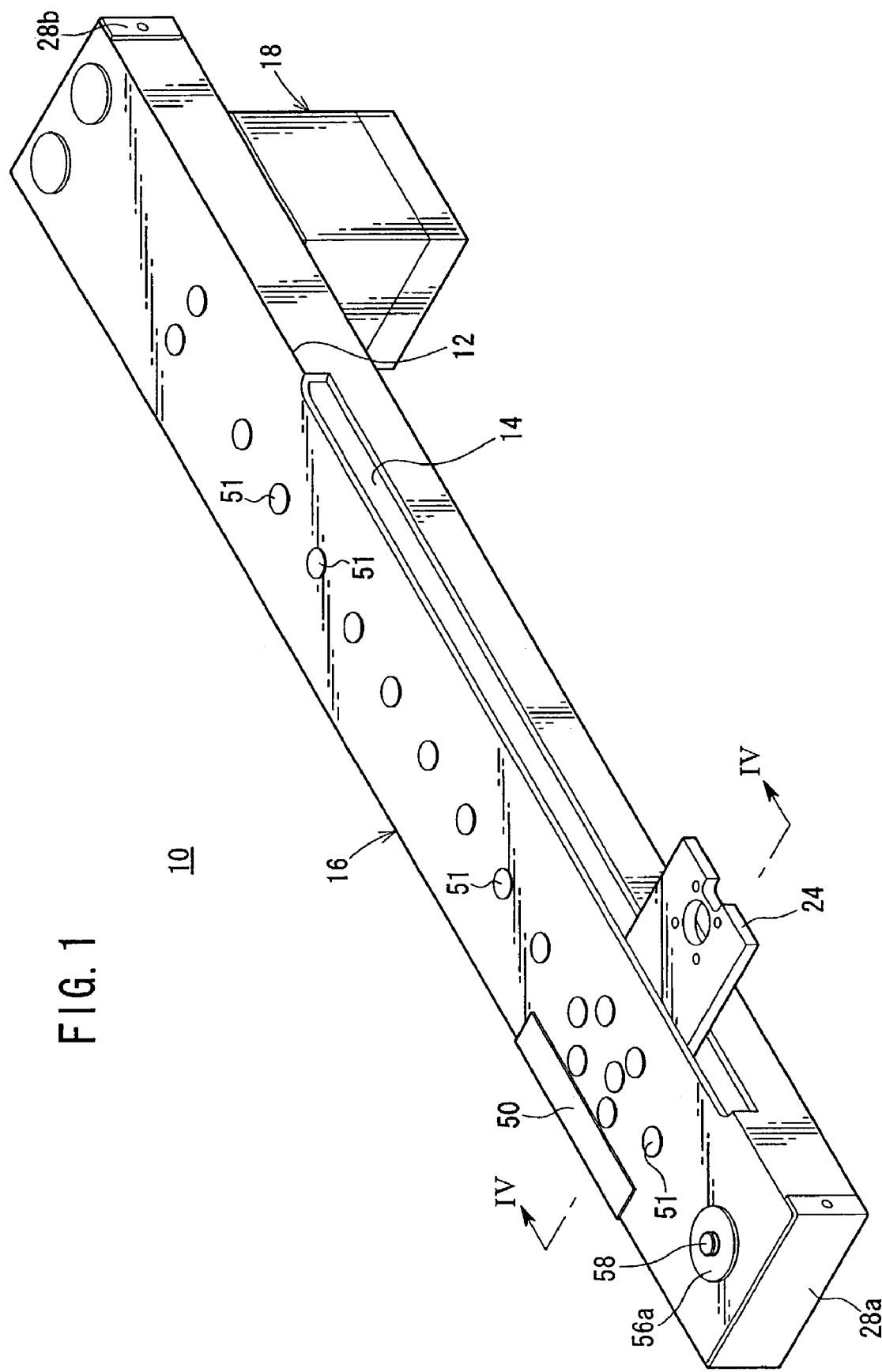
FIG. 1 is a perspective view illustrating an electric actuator according to an embodiment of the present invention.
Figure 2:
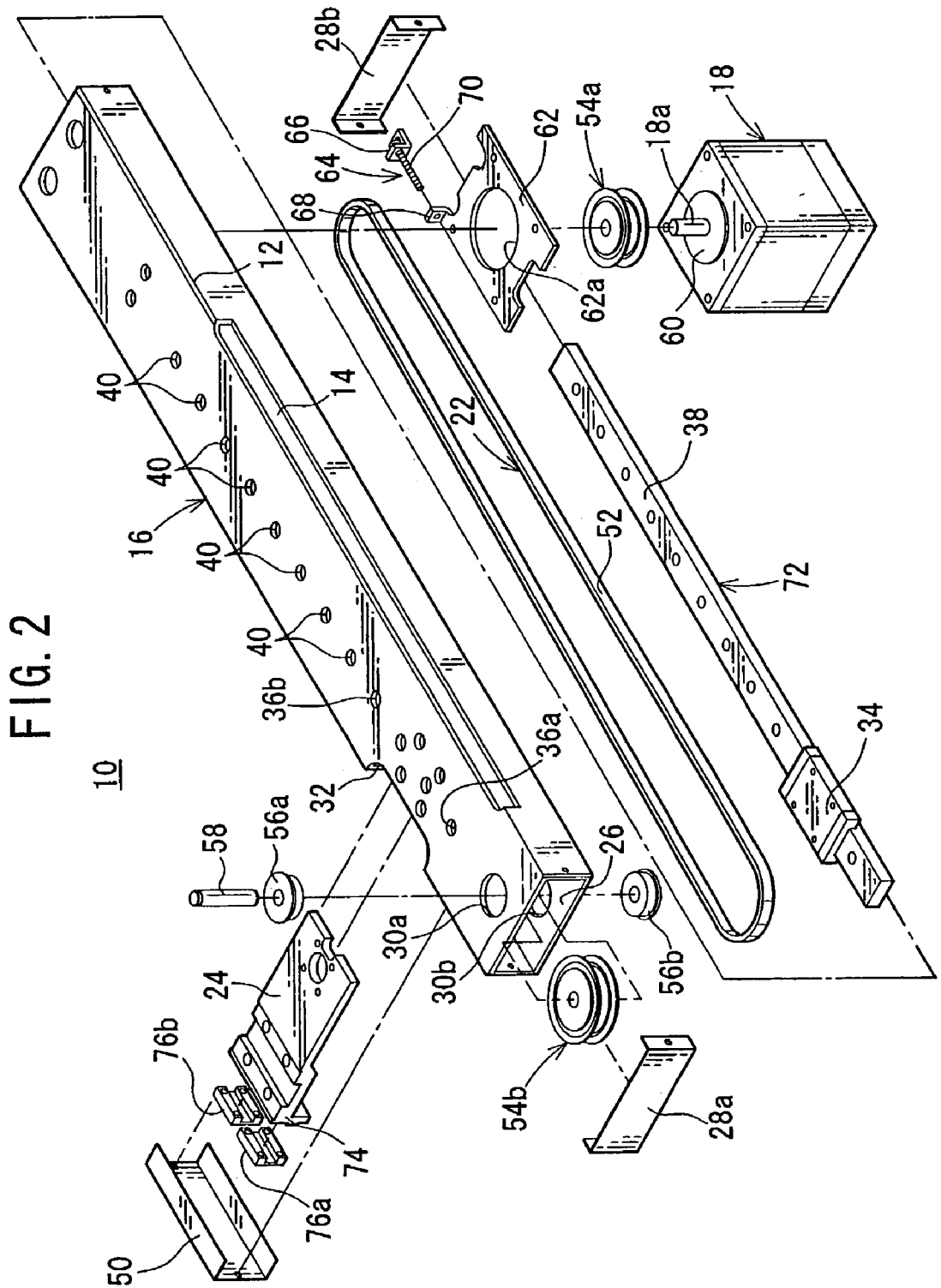
FIG. 2 is an exploded perspective view illustrating the electric actuator shown in FIG. 1.

With reference to FIGS. 1 and 2, reference numeral 10 indicates an electric actuator according to an embodiment of the present invention.

The electric actuator 10 comprises an actuator body 16 which is a rectangular tube having two pairs of opposing surfaces disposed substantially in parallel to one another and which has a slit 14 formed to extend linearly by a predetermined length along an edge 12 of the rectangular tube, and a rotary driving source (driving source) 18 which is connected to one end of the actuator body 16.

In this arrangement, the actuator body 16 is the flat rectangular tube in which the dimension in the horizontal direction is larger than the dimension in the height direction in order to respond to an environment of installation in which the dimension in the height direction is restricted.

The electric actuator 10 further comprises a driving force-transmitting mechanism 22 (see FIG. 3) which is arranged in a space 20 (see FIG. 4) surrounded by the actuator body 16 and which converts the rotary driving force of the rotary driving source 18 into the rectilinear motion to be transmitted, and a slider 24 which is provided to have a part exposed through the slit 14 and which reciprocates in the axial direction of the actuator body 16 in accordance with the reciprocating motion transmitted by the driving force-transmitting mechanism 22.

The actuator body 16 is formed, for example, by extruding a metal material such as aluminum or aluminum alloy. As shown in FIG. 2, a pair of end covers 28a, 28b, which close openings 26 of the rectangular tube, are fixed to both ends of the actuator body 16.

Figure 8:
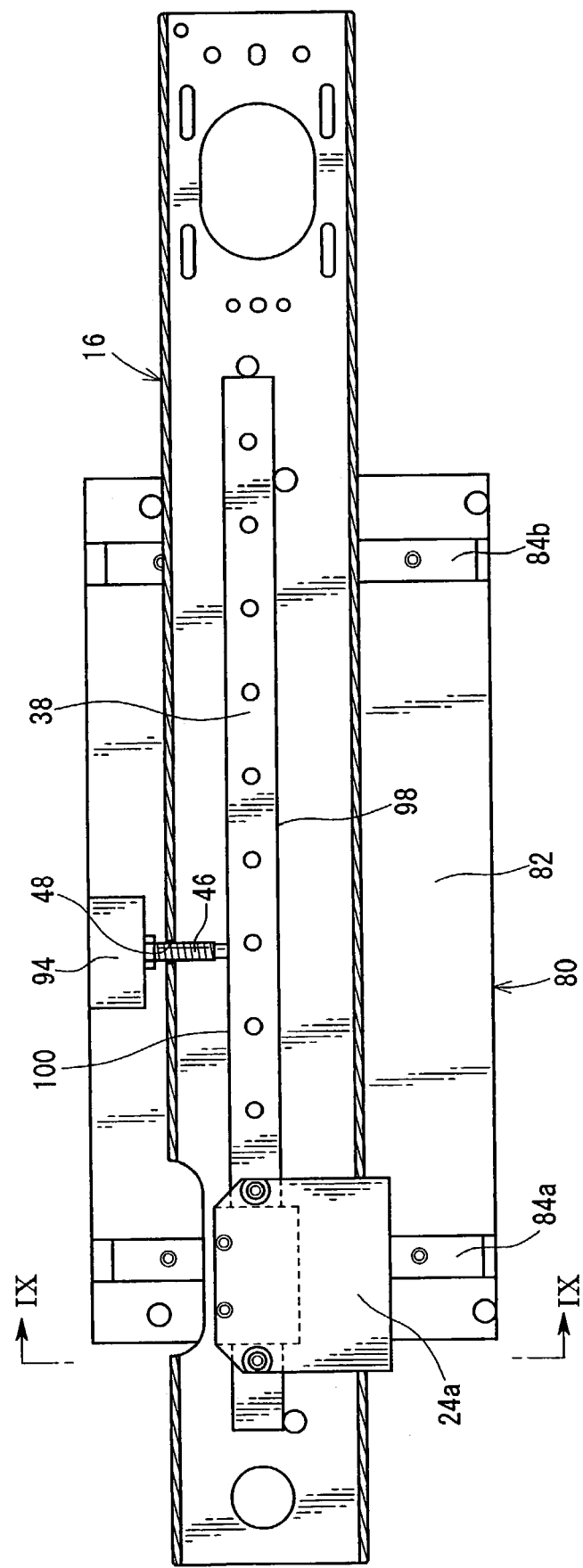
FIG. 8 is a transverse sectional view illustrating a state in which the linear guide rail is positioned in the space of the actuator body.

Further, the following are formed on the side surfaces of the actuator body 16: pulley attachment holes 30a, 30b for attaching pulleys as described later on; a slider-inserting opening 32; a pair of slider attachment holes 36a, 36b (see FIGS. 2 and 6) for attaching the slider 24 to a guide block 34; a plurality of guide attachment holes 40 for attaching a linear guide rail 38; positioning holes 44a to 44c (see FIG. 6) for positioning the actuator body 16 at a predetermined position by inserting positioning pins 42a to 42c of a jig 80 thereinto as described later on; and a positioning shaft-inserting hole 48 (see FIG. 8) for inserting a positioning-shaft 46 of the jig 80 thereinto as described later on respectively.

The slider-inserting opening 32 is closed by a cover member 50. The slider attachment holes 36a, 36b and the guide attachment holes 40 are closed by plug members 51 respectively (see FIG. 1).

Figure 3:
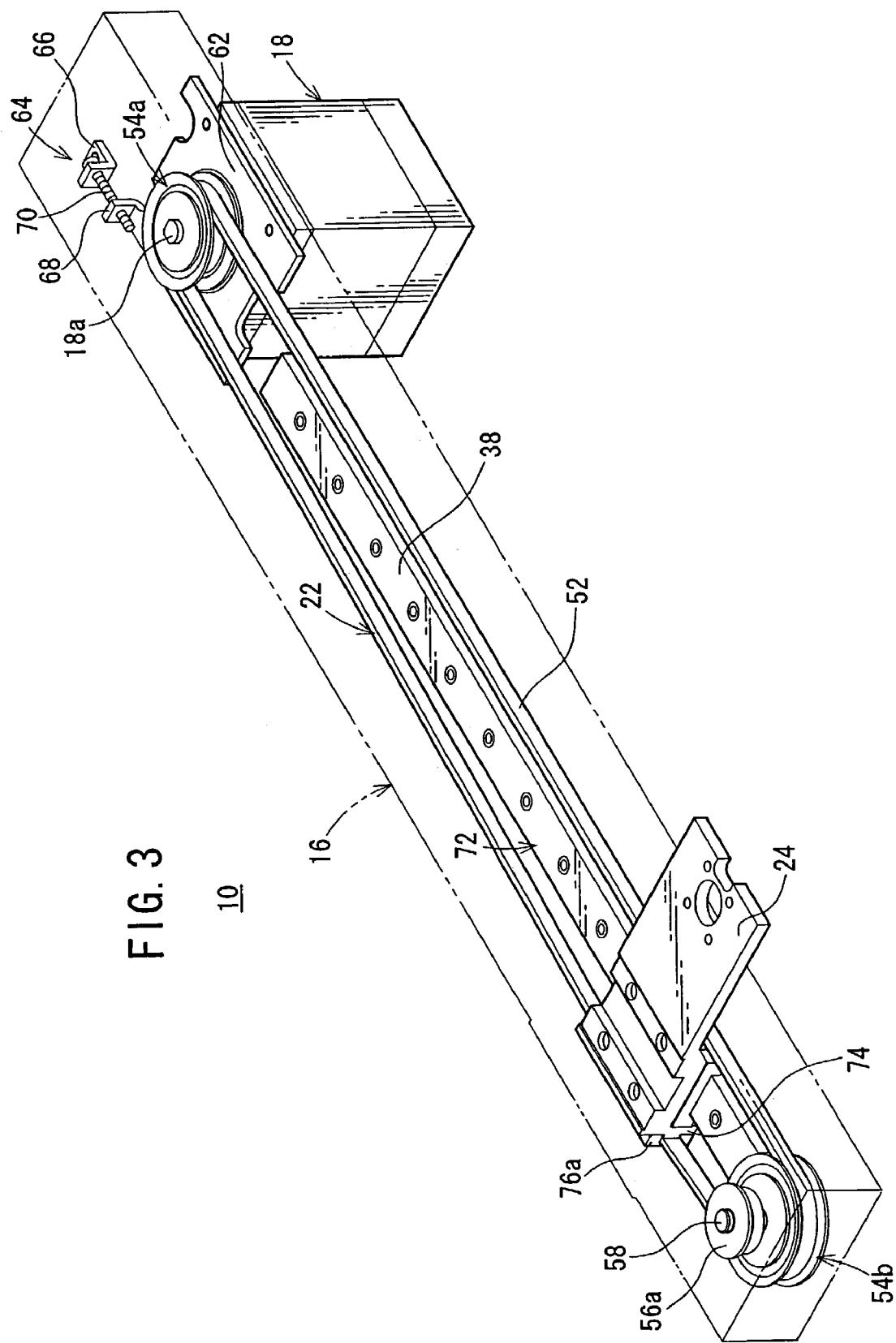
FIG. 3 is a perspective view illustrating a rotary driving source and a driving force-transmitting mechanism of the electric actuator shown in FIG. 1.
Figure 4:
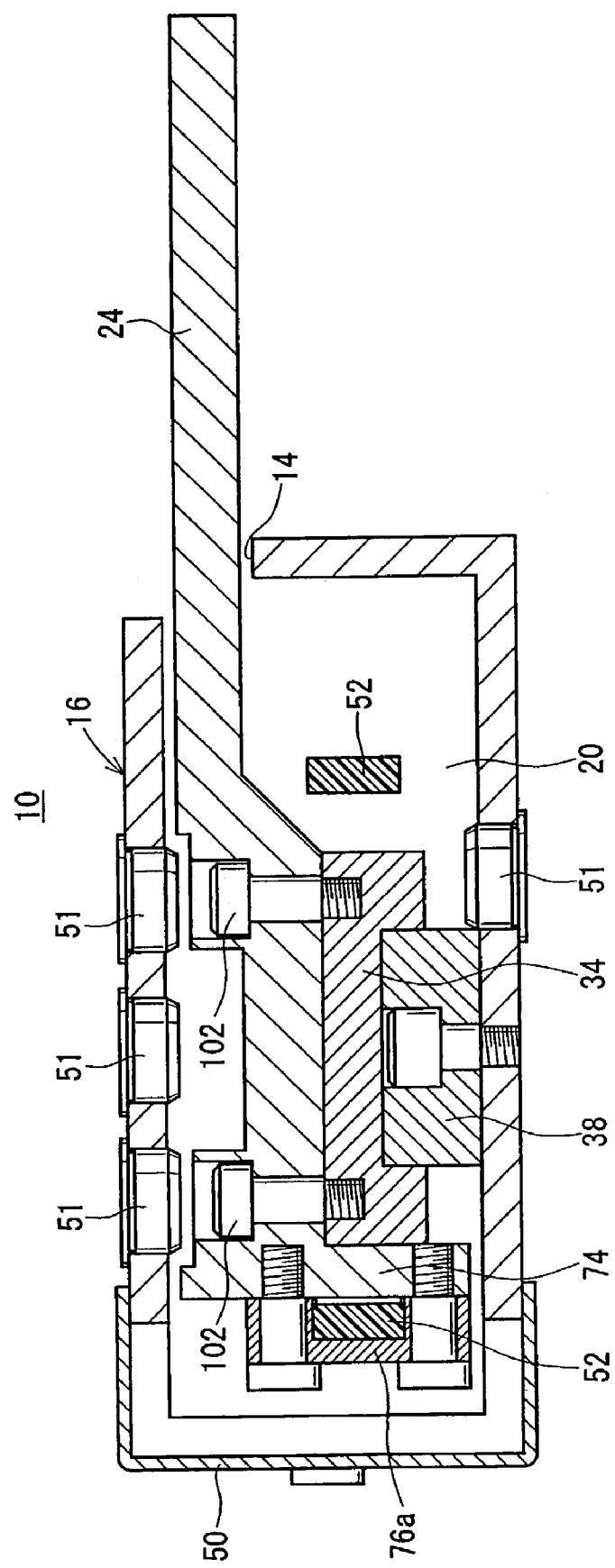
FIG. 4 is a vertical sectional view taken along a line IV—IV shown in FIG. 1.

As shown in FIG. 3, a pair of pulleys 54a, 54b, over which a timing belt 52 runs, are arranged in the axial direction while being separated by a predetermined distance in the space 20 of the actuator body 16. One driving pulley 54a is rotatably attached to the drive shaft 18a of the rotary driving source 18. The other driven pulley 54b is rotatably supported by a shaft 58 and a pair of disk-shaped bearing members 56a, 56b which are fitted into the pulley attachment holes 30a, 30b. The pair of pulleys 54a, 54b and the timing belt 52 function as the driving force-transmitting mechanism.

The rotary driving source 18 is fixed by unillustrated screw members to be inserted into slotted holes formed on one end of the actuator body 16. The rotary driving source 18 is provided adjustably by a minute distance along the slotted holes. A disk-shaped projection 60 is formed in the vicinity of the drive shaft 18a of the rotary driving source 18. The disk-shaped projection 60 is engaged with an engagement hole 62a of a plate 62 which is arranged in the space 20 of the actuator body 16 (see FIG. 2).

A tension mechanism 64 is provided (see FIGS. 2 and 3), which adjusts the tensile force of the timing belt 52 by adjusting the distance between the pulleys 54a, 54b. The tension mechanism 64 comprises a fixed piece 66 which is fixed to the inner wall surface of the space 20 of the actuator body 16, the plate 62 which has the engagement hole 62a formed for engaging the disk-shaped projection 60 of the rotary driving source 18, a fastening piece 68 which is formed and bent so that the fastening piece 68 is substantially perpendicular to the plane of the plate 62, and a screw member 70 which penetrates through screw holes of the fixed piece 66 and the fastening piece 68 respectively.

In this arrangement, the plate 62 is displaced by a minute distance in the axial direction of the actuator body 16 by adjusting the amount of screwing of the screw member 70, and thus the position of the driving pulley 54a rotatably attached to the drive shaft 18a is appropriately adjusted. The tensile force of the timing belt 52 stretched between the pulleys 54a, 54b can be adjusted by adjusting the distance between the driving pulley 54a and the driven pulley 54b.

A guide mechanism 72, which displaces the slider 24 linearly along the slit 14, is provided in the space 20 of the actuator body 16. The guide mechanism 72 comprises the linear guide rail 38 which is fixed on the inner bottom wall of the actuator body 16 (in the space 20 of the actuator body 16), and the guide block 34 which is provided displaceably together with the slider 24 and which slides along the linear guide rail 38.

As shown in FIG. 2, the timing belt 52 is interposed between a bent section 74 formed on the side of the slider 24 and a pair of fixing blocks 76a, 76b. When the timing belt 52 running over the pair of pulleys 54a, 54b is rotated in a predetermined direction, the slider 24 is displaced linearly together with the timing belt 52.

The electric actuator 10 according to the embodiment of the present invention is basically constructed as described above. Next, its operation, function, and effect will be explained.

Firstly, an explanation will be made below about a method of assembling the guide mechanism 72 into the space 20 of the actuator body 16 by using the jig 80.

Figure 5:
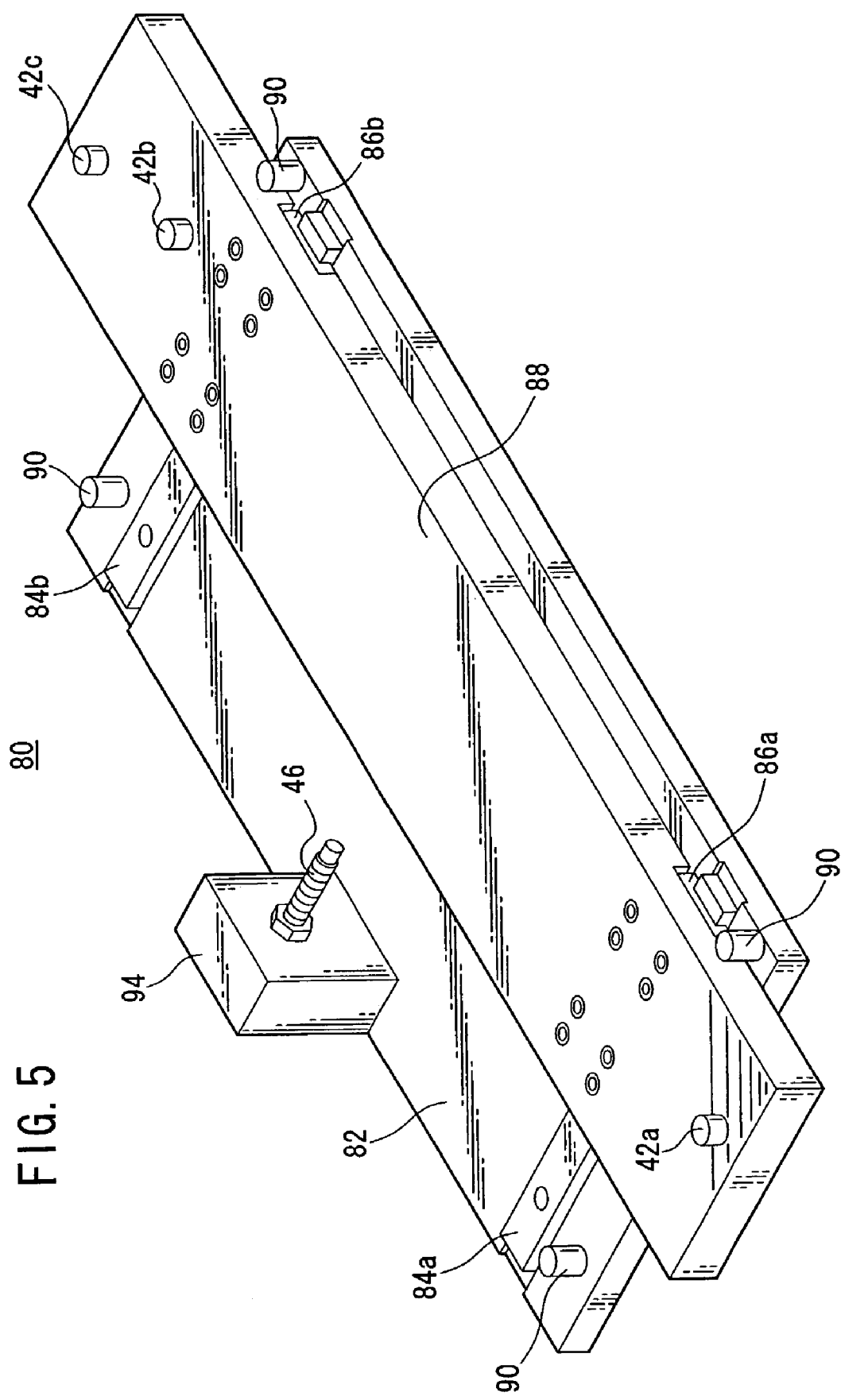
FIG. 5 is a perspective view illustrating a jig to be used for assembling the electric actuator shown in FIG. 1.

As shown in FIG. 5, the jig 80 includes a base 82, a pair of rail members 84a, 84b which are provided in parallel in a direction substantially perpendicular to the axis of the base 82 on the upper surface of the base 82, and a positioning plate 88 which is provided displaceably in the direction substantially perpendicular to the axis of the base 82 by blocks 86a, 86b which are slidable along the rail members 84a, 84b. The displacement of the positioning plate 88 is restricted by a plurality of stopper pins 90 which are provided at portions disposed closely to the four corners of the base 82.

The jig 80 further includes the plurality of positioning pins 42a to 42c which protrude by predetermined lengths on the upper surface of the positioning plate 88 and which are inserted into the positioning holes 44a to 44c to hold the actuator body 16 in a positioned state thereby, the positioning-shaft 46 which has an end that faces the interior of the space 20 of the actuator body 16 to abut against the side (second side 100 as described later on) of the linear guide rail 38, and a support block 94 which supports the positioning-shaft 46.

Figure 6:
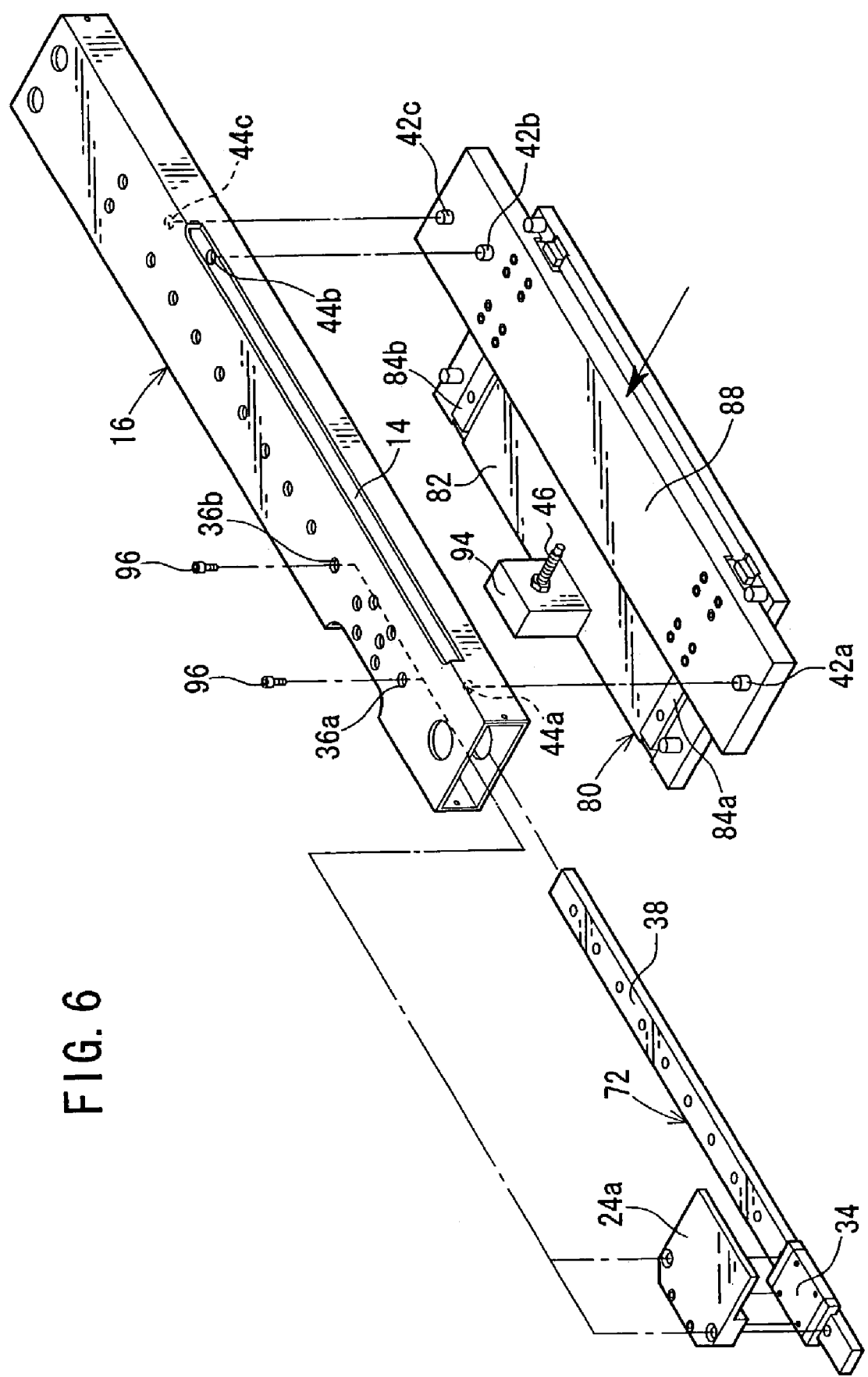
FIG. 6 is a perspective view illustrating a state in which a guide mechanism is positioned in the space of an actuator body by using the jig shown in FIG. 5.

As shown in FIG. 6, the plurality of positioning pins 42a to 42c provided on the positioning plate 88 of the jig 80 are inserted into the positioning holes 44a to 44c of the actuator body 16, and the guide mechanism 72 is inserted into the space 20 in the axial direction via the opening 26 disposed at one end of the actuator body 16. A dummy slider 24a, whose width is smaller than that of the slider 24, is connected to the upper surface of the guide block 34 of the guide mechanism 72, for the following reason. The slider 24, which is to be practically used, is designed to have a width that is larger than the width of the opening 26, and hence it is difficult to insert the slider 24 from the opening 26 of the actuator body 16.

When the positioning pins 42a to 42c on the upper surface of the positioning plate 88 are inserted into the positioning holes 44a to 44c on the bottom surface of the actuator body 16, the actuator body 16 is positioned at a predetermined position on the jig 80. The positioning pins 42a to 42c penetrate through the actuator body 16, and the ends of the positioning pins 42a to 42c protrude by predetermined lengths.

Figure 7:
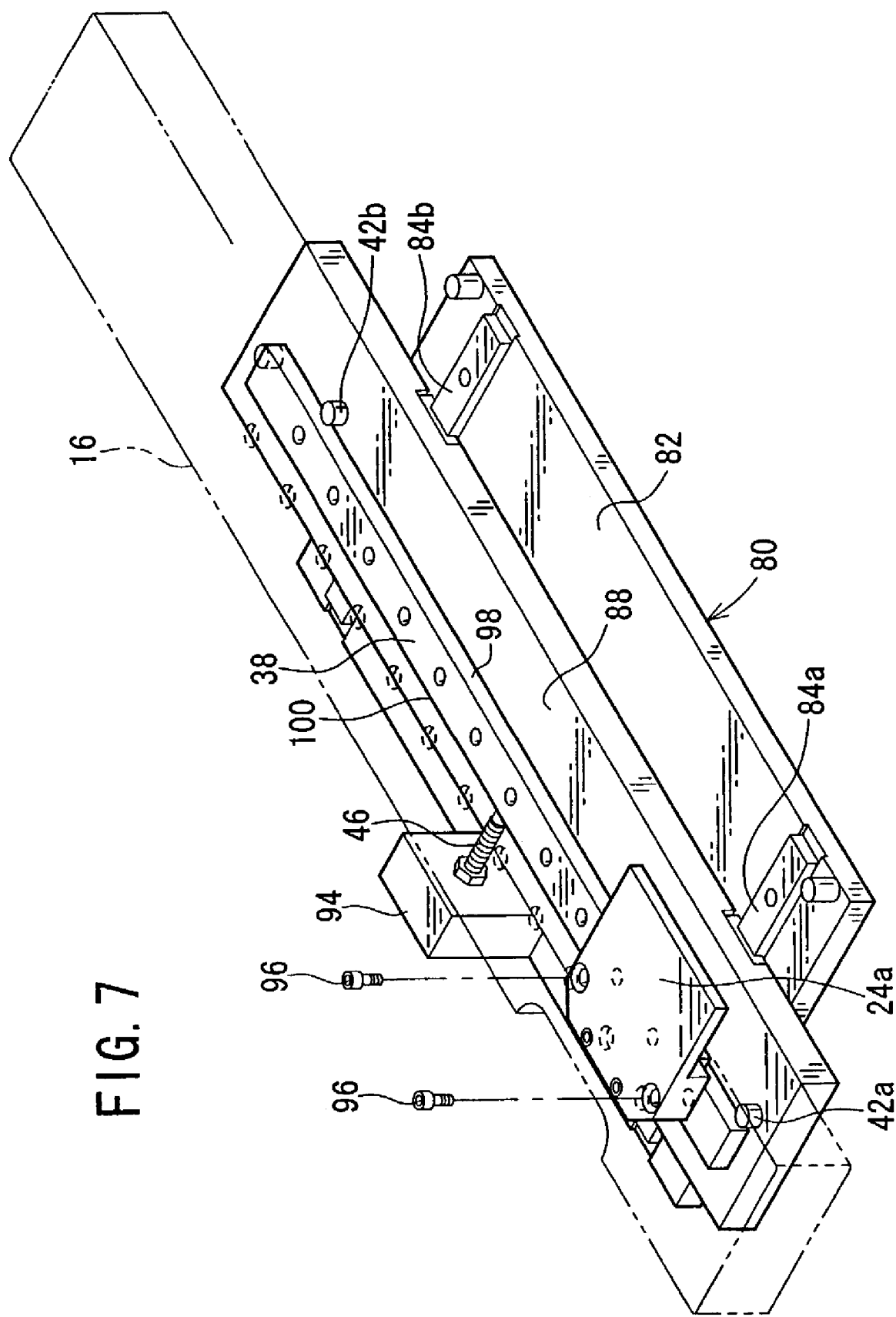
FIG. 7 is a perspective view illustrating a state in which a linear guide rail is positioned on the jig shown in FIG. 5.

The dummy slider 24a protruding from the slit 14 of the actuator body 16 is connected to the guide block 34 by bolts 96 inserted into the slider attachment holes 36a, 36b. A part of the connected dummy slider 24a is gripped, and the linear guide rail 38, which is inserted into the space 20, is slid in the widthwise direction (substantially perpendicular to the axis) of the actuator body 16. The first side 98 of the linear guide rail 38 is engaged with the set of the protruding positioning pins 42a to 42c (see FIG. 7).

The actuator body 16 is displaced in the widthwise direction substantially perpendicular to the axis together with the positioning plate 88 while the set of the positioning pins 42a to 42c is engaged with the first side 98 of the linear guide rail 38. One end of the positioning-shaft 46 is inserted into the positioning shaft-inserting hole 48 of the actuator body 16. Further, one end of the positioning-shaft 46, which penetrates through the positioning shaft-inserting hole 48 into the space 20, abuts against the second side 100 of the linear guide rail 38 (see FIG. 8).

Figure 9:
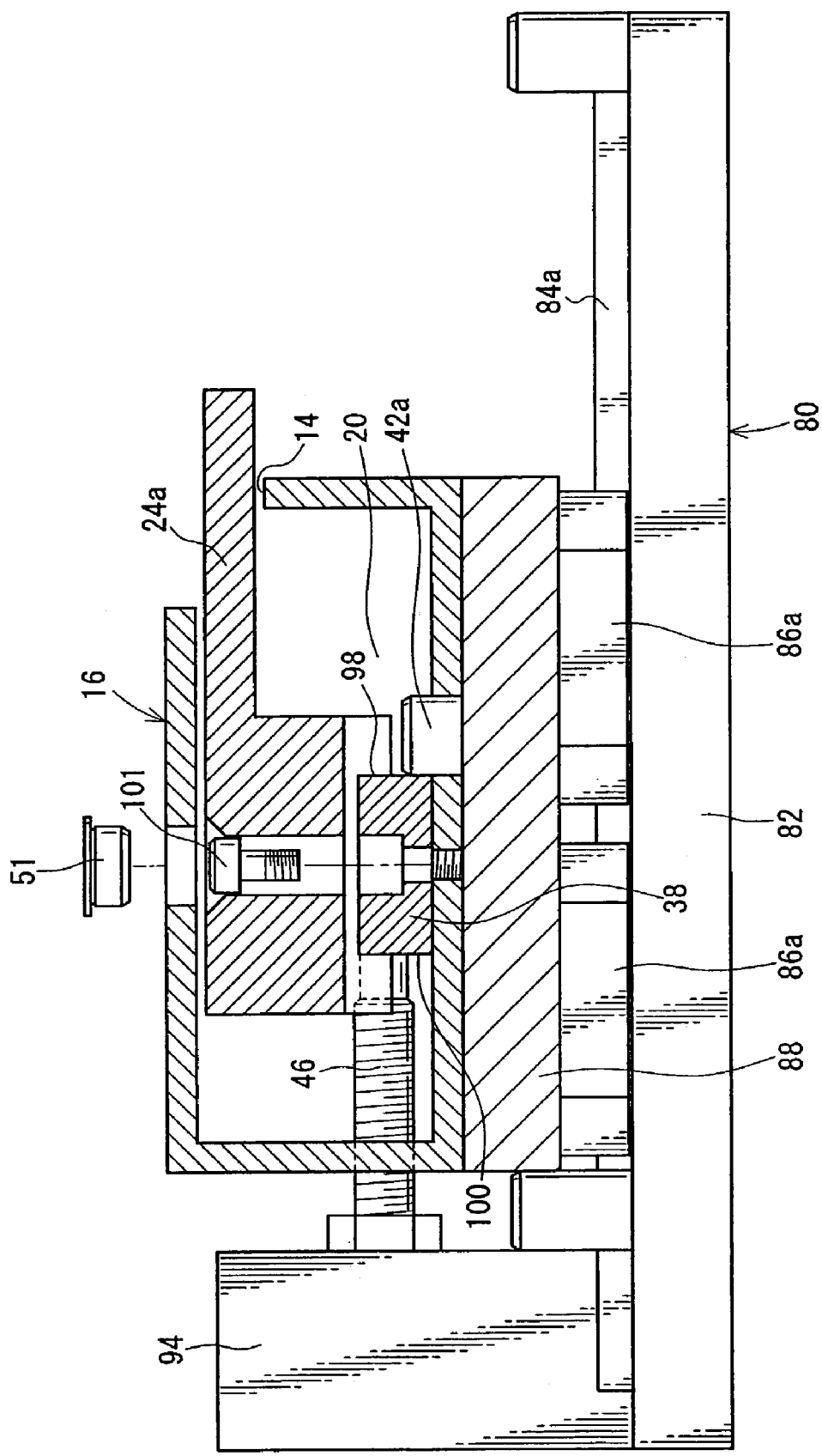
FIG. 9 is a vertical sectional view taken along a line IX—IX shown in FIG. 8.

Therefore, the linear guide rail 38 inserted into the space 20 of the actuator body 16 is positioned at a predetermined position in the space 20 of the actuator body 16 such that the first side 98 is positioned by the abutment against the set of the positioning pins 42a to 42c which penetrate through and protrude from the positioning holes 44a to 44c, and the second side 100 opposite to the first side 98 is positioned by the abutment against the end of the positioning-shaft 46 (see FIG. 9).

While the linear guide rail 38 is positioned in the space 20 of the actuator body 16 as described above, the linear guide rail 38 is fixed to the inner wall surface of the actuator body 16 (see FIG. 9) by bolts 101 to be inserted along the guide attachment holes 40 which are formed in the upper surface of the actuator body 16.

Further, the dummy slider 24a is detached from the guide block 34. The slider 24, which is practically used, is inserted through the slider-inserting opening 32. The slider 24 is connected to the guide block 34 by bolts 102 to be inserted along the slider attachment holes 36a, 36b (see FIG. 4). In this arrangement, the hole of the slider 24, into which the bolt 102 is inserted, has an upper portion having a tapered cross section with an expanded diameter. Therefore, it is possible to insert the bolt 102 with ease.

The axis of the actuator body 16 is allowed to coincide with the axis of the linear guide rail 38 as described above, and thus it is possible to obtain a highly accurate concentric level.

Next, the operation of the electric actuator 10 will be explained. When an unillustrated power source is energized, the drive shaft 18a of the rotary driving source 18 is rotated in a predetermined direction. The driving pulley 54a, which is rotatably attached to the drive shaft 18a of the driving source 18, is rotated in a predetermined direction, and the timing belt 52, is rotated over the pulleys 54a, 54b. Therefore, the slider 24 is displaced linearly along the slit 14 by the timing belt 52 which is interposed between the bent section 74 and the fixing blocks 76a, 76b.

When the polarity of the current supplied to the rotary driving source 18 is reversed from the above, the timing belt 52 is rotated in an opposite direction. Accordingly, the slider 24 can be also displaced in an opposite direction.

Figure 10:
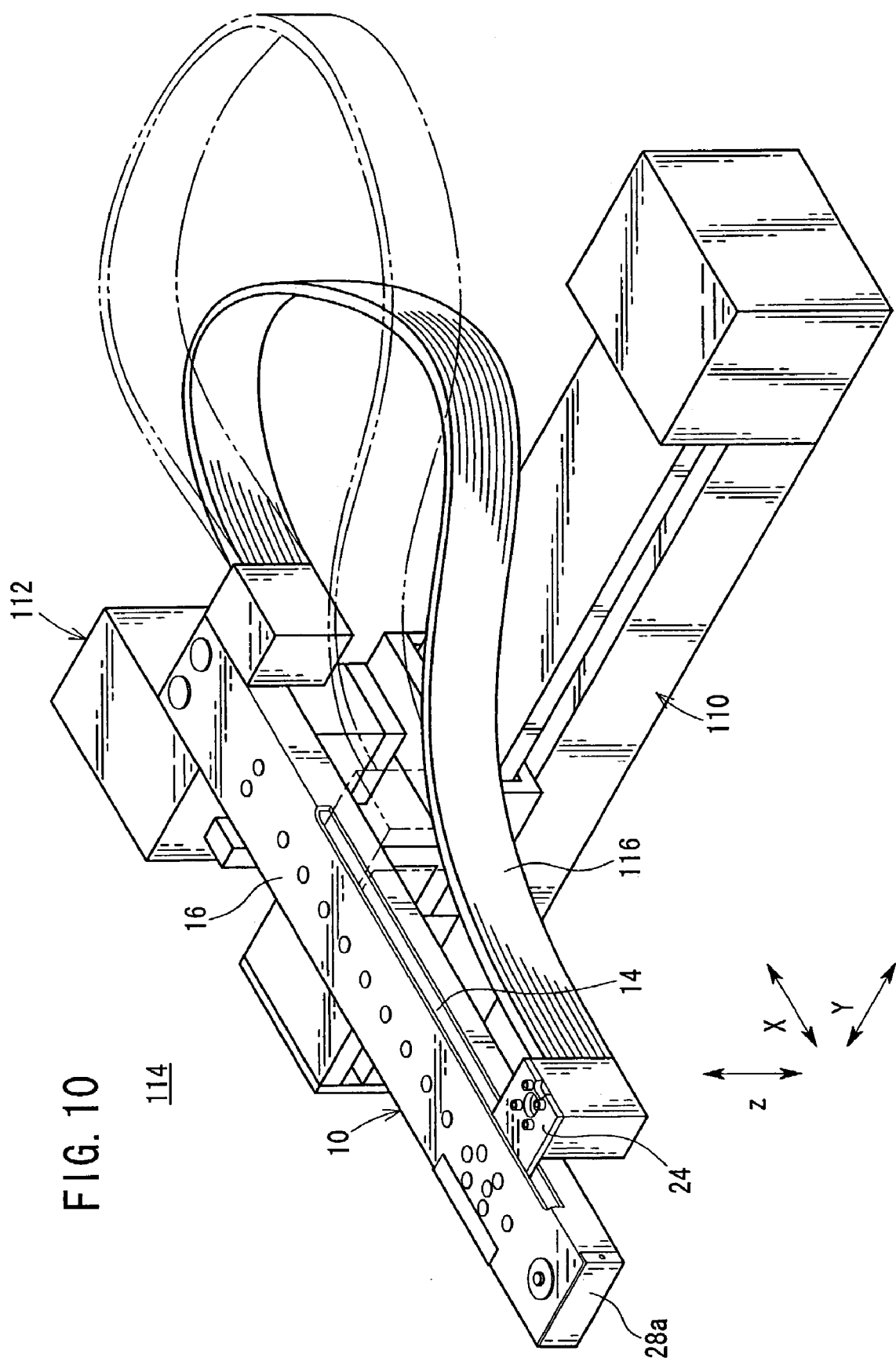
FIG. 10 is a perspective view illustrating a state in which the electric actuator shown in FIG. 1 is assembled to an apparatus which is displaceable in the three-axis directions of X, Y, and Z which are mutually orthogonal.

As shown in FIG. 10, the electric actuator 10 according to the embodiment of the present invention may be assembled together with other actuators 110, 112 to construct an apparatus 114 which is displaceable in the three-axis directions of X, Y, and Z which are mutually orthogonal. In FIG. 10, reference numeral 116 indicates a flexible cable for feeding, for example, an electric signal and a fluid pressure signal.

In the embodiment of the present invention, a variety of functional elements are contained in the space 20 of the actuator body 16 having the closed space cross-sectional structure (a tube structure having a rectangular cross section). Accordingly, it is possible to secure the maximum dimension of the actuator body 16 in the restricted space 20. The contour dimension of the actuator body 16 becomes the cross-sectional dimension and it is possible to secure the maximum dimension of the actuator body 16 in the cross-sectional dimension space where the space is limited in the height direction. In other words, it is possible to obtain an ultimate geometrical moment of inertia by allowing the actuator body 16 to have a monocoque structure.

When desired to obtain a specified rigidity, it is possible to reduce, for example, the wall thickness of the actuator body 16. Thus, it is possible to realize a decrease in weight (overall increase in rigidity) and reduce the cost.

The plurality of functional elements (e.g., the guide mechanism 72, the driving force-transmitting mechanism 22, and the tension mechanism 64) are accommodated in the space 20 of the actuator body 16. Accordingly, it is possible to vary the direction of the rigid support means for the functional elements in a multidimensional manner. It is also possible to decrease the dependency on the auxiliary support member; therefore to realize a light weight to a greater extent. The plurality of functional elements can be directly supported on the actuator body 16. Therefore, it is possible to improve the accuracy of support of the functional element.

When the direction of the rigid support means for the functional elements is varied in a multidimensional manner, the layout of the functional elements becomes flexible. For example, when the linear guide rail 38 is attached upside down in the space 20 of the actuator body 16, it is possible to fix the linear guide rail 38 to a portion to which the cover is installed conventionally.

Therefore, it is possible to improve the space efficiency by arranging the functional elements most appropriately to miniaturize the entire apparatus, and therefore, it is possible to equip elements having higher specifications (larger sizes). Furthermore, it is possible to further increase the rigidity by increasing the wall thickness of the actuator body 16, and it is possible to realize the optimum arrangement for the required performance. For example, the direction of load, which is most advantageous for the guide mechanism 72, can be set in conformity with the direction of load on the electric actuator 10.

When the area of the opening of the actuator body 16 is decreased, it is possible to decrease the dependency on the unillustrated conventional cover. That is, when the unillustrated cover and the frame (actuator body 16) are integrated into one unit, it is unnecessary to provide the cover, and the rigidity can be further enhanced at the portion at which the cover is provided.

Further, because of the decrease in area of the opening of the actuator body 16, it is possible to realize the cleanness and the protection against dust. In particular, the contour structure of the actuator body 16 having the integrated structure decreases the necessity for the sealing and the shielding for both of the frame and the cover, as compared with the connected structure of the frame and the cover. Therefore, it is easy to respond to the protection against water, the protection against mist (difficulty of permeation of liquid), and the high degree of vacuum (gas seal).

When the tube structure of the rectangular tube type is adopted for the actuator body 16, it is possible to increase the flexibility of the attachment posture. It is also possible to decrease the dependency on the external support structure for the actuator such as a conventional bracket. Thus, it is possible to increase the overall rigidity, and to realize light weight and compact size.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. An electric actuator, comprising:
   an actuator body which is a unitary four-sided rectangular tube all sides of which are integrally and seamlessly joined to each other and having two pairs of opposing surfaces, and which has a slit formed to extend by a predetermined length along an edge of said rectangular tube, said edge being defined as an intersection of two of said sides of said four-sided rectangular tube;
   a driving source which is connected to an end of said actuator body;
   a driving force-transmitting mechanism which is arranged in a space surrounded by said actuator body and which transmits a driving force of said driving source; and
   a slider which reciprocates along said slit of said actuator body by means of said driving force transmitted from said driving force-transmitting mechanism,
   wherein said slider comprises a plate-shaped portion passing through said slit and extending a distance beyond a side surface of said actuator body, said plate-shaped portion lying in a horizontal plane parallel to a horizontally disposed base of said actuator body, and
   wherein said actuator body is formed to be flat so that a dimension of said actuator body in a horizontal direction is larger than a dimension of said actuator body in a height direction.

2. The electric actuator according to claim 1, wherein said actuator body comprises a seamless extruded metal body formed by extruding a metal material of aluminum or aluminum alloy.

3. The electric actuator according to claim 1, wherein said driving force-transmitting mechanism includes a driving pulley which is connected to a drive shaft of a rotary driving source, a driven pulley which is rotatably supported at a portion spaced by a predetermined distance from said driving pulley, and a timing belt which runs over said driving pulley and said driven pulley.

4. The electric actuator according to claim 3, further comprising a tension mechanism which adjusts a tensile force of said timing belt by adjusting a distance between said driving pulley and said driven pulley.

* * * * *